United States Patent
Zhang

(10) Patent No.: US 6,707,752 B2
(45) Date of Patent: Mar. 16, 2004

(54) TAG DESIGN FOR CACHE ACCESS WITH REDUNDANT-FORM ADDRESS

(75) Inventor: Kevin Zhang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 105 days.

(21) Appl. No.: 09/887,870

(22) Filed: Jun. 22, 2001

(65) Prior Publication Data

US 2002/0196676 A1 Dec. 26, 2002

(51) Int. Cl.[7] ............................. G11C 5/00; G11C 7/00
(52) U.S. Cl. ...................... 365/230.06; 365/230.03; 365/230.04; 365/200
(58) Field of Search .................... 365/200, 230.03, 365/230.04, 230.06

(56) References Cited

U.S. PATENT DOCUMENTS

| | | | |
|---|---|---|---|
| 4,804,871 A | | 2/1989 | Walters, Jr. |
| 4,905,189 A | | 2/1990 | Brunolli |
| 4,926,385 A | | 5/1990 | Fujishima et al. |
| 5,179,536 A | * | 1/1993 | Kasa et al. ............. 365/200 |
| 5,227,997 A | * | 7/1993 | Kikuda et al. ......... 365/189.08 |
| 5,253,203 A | | 10/1993 | Partovi et al. |
| 5,257,236 A | | 10/1993 | Sharp |
| 5,315,558 A | * | 5/1994 | Hag .................... 365/189.04 |
| 5,353,424 A | | 10/1994 | Partovi et al. |
| 5,488,583 A | * | 1/1996 | Ong et al. .............. 365/201 |
| 5,523,974 A | * | 6/1996 | Hirano et al. ........... 365/200 |
| 5,532,947 A | | 7/1996 | Potter et al. |
| 5,542,062 A | | 7/1996 | Taylor et al. |
| 5,555,529 A | | 9/1996 | Hose, Jr. et al. |
| 5,568,442 A | | 10/1996 | Kowalczyk et al. |
| 5,577,223 A | | 11/1996 | Tanoi et al. |
| 5,583,806 A | | 12/1996 | Widigen et al. |
| 5,640,339 A | | 6/1997 | Davis et al. |
| 5,657,281 A | * | 8/1997 | Rao ...................... 365/200 |
| 5,657,469 A | | 8/1997 | Shimizu |
| 5,680,569 A | | 10/1997 | Correll |
| 5,710,731 A | | 1/1998 | Ciraula et al. |
| 5,717,648 A | | 2/1998 | Davis et al. |
| 5,754,819 A | | 5/1998 | Lynch et al. |
| 5,758,178 A | | 5/1998 | Lesartre |
| 5,822,257 A | * | 10/1998 | Ogawa .................. 365/200 |

(List continued on next page.)

FOREIGN PATENT DOCUMENTS

| WO | WO 99/64 953 | 12/1999 |
|---|---|---|
| WO | US 02/18 181 | 10/2002 |

OTHER PUBLICATIONS

Cortadella, J., et al., "Evaluation of A+B=K Conditions Without Carry Propagation," IEEE Transactions on Computers, vol. 41, No. 11, pp. 1484–1488, Nov. 1992.

Heald, R., et al., "Sum–Addressed–Memory Cache with 1.6ns Latency," IEEE ISSCC, Paper SP22.2, 2 pages, Feb. 7, 1998.

Cortadella, J., et al., "Evaluating "A+B=K" Conditions in Constant Time," IEEE Proceedings, vol. 1, CH2458–8, Jun. 7–9, 1988.

Lutz, D., et al., "The Half–Adder Form and Early Branch Condition Resolution," IEEE ARITH'97, pp. 266–273, Jul. 6–9, 1997.

Lutz, D., et al., "Early Zero Detection," IEEE ICCD'96, pp. 545–550, Oct. 7–9, 1996.

*Primary Examiner*—David Nelms
*Assistant Examiner*—Ly Duy Pham

(57) ABSTRACT

A memory and method for accessing data in a memory which uses non redundant-form address decoders is disclosed. Lines in subarrays of the memory are selected using the redundant-form addresses. The least significant bit of the non redundant-form address is used to select between these lines. The compare function of the cache memory is then done with a non redundant-form address.

21 Claims, 2 Drawing Sheets

U.S. PATENT DOCUMENTS

| | | |
|---|---|---|
| 5,841,687 A | 11/1998 | Rees |
| 5,841,961 A | 11/1998 | Kozaru et al. |
| 5,854,761 A | 12/1998 | Patel et al. |
| 5,860,092 A | 1/1999 | Breid et al. |
| 5,890,201 A | 3/1999 | McLellan et al. |
| 5,920,515 A * | 7/1999 | Shaik et al. ................. 365/200 |
| 5,933,376 A | 8/1999 | Lee |
| 5,956,274 A * | 9/1999 | Elliott et al. ........... 365/189.02 |
| 6,058,053 A | 5/2000 | Tsuji et al. |
| 6,098,150 A | 8/2000 | Brethour et al. |
| 6,144,592 A | 11/2000 | Kanda |
| 6,166,973 A * | 12/2000 | Shinozaki ................... 365/200 |
| 6,172,933 B1 * | 1/2001 | Sager .................... 365/230.01 |
| 6,181,612 B1 | 1/2001 | Wada |
| 6,209,076 B1 | 3/2001 | Blomgren |
| 6,212,109 B1 * | 4/2001 | Proebsting ............. 365/189.01 |
| 6,256,238 B1 | 7/2001 | Nagasawa et al. |
| 6,256,709 B1 | 7/2001 | Patel |
| 6,341,327 B1 * | 1/2002 | Sager ......................... 711/108 |
| 6,356,485 B1 | 3/2002 | Proebsting |
| 6,363,020 B1 | 3/2002 | Shubat |
| 6,373,753 B1 * | 4/2002 | Proebsting ............. 365/189.09 |
| 6,373,758 B1 * | 4/2002 | Hughes et al. .............. 365/200 |

\* cited by examiner

TAG DESIGN FOR CACHE ACCESS WITH REDUNDANT-FORM ADDRESS

FIELD OF THE INVENTION

The invention relates to field of memories particularly those using redundant-form addresses.

PRIOR ART AND RELATED ART

The latency of on-chip caching has become more and more important to the overall performance of microprocessors. To speed up cache access, a redundant-form addressing system is known which permits cache access before the final complete address becomes available. In general, the ordinary binary address is replaced with a more complex address (redundant-form). In effect, address components from an adder are used since these are more quickly available. For instance, these components are not delayed by the carry chain needed to complete the ordinary address. Aspects of this technology are described in PCT Application WO 99/64953; co-pending application Ser. No. 09/532,411 entitled "Shared Cache Word Line Decoder For Redundant And Regular Addresses" filed Mar. 22, 2000; and application Ser. No. 09/538,553 entitled "Cache Column Multiplexing Using Redundant Form Addresses" filed Mar. 29, 2000.

One problem associated with using redundant-form addresses is that it is costly to do redundant-form tag compares. Substantial additional circuitry is required to handle the redundant-form tag comparison.

As will be seen, the present invention solves this problem.

DETAILED DESCRIPTION OF THE INVENTION

A memory is described particularly useful for caching where redundant-form addresses are used. In the following description, embodiments of the invention are described for a cache memory having a particular architecture. It will be apparent to one skilled in the art that the invention may be practiced without these specific embodiments. In other instances, well-known circuits, such as comparators, have not been shown in detail in order not to obscure the present invention.

Overview of One Embodiment

The memory array (which includes at least the tag fields and associated data for one embodiment) is first divided into odd and even entries (sometimes also referred herein to as subarrays). A redundant-form address is used by decoders to select a line in both the even and odd subarrays. Also a small differential voltage is developed at the bit lines in the arrays. While this is occurring, the least significant bit (LSB) for the ordinary (non redundant-form address) is generated along with the final (non redundant) address bits. The LSB is used to enable the sense amplifiers associated with one of the odd or even subarrays. The output of the sense amplifiers drive a common data bus, shared by both odd and even subarrays. The tag field of the data from the selected subarray is coupled to a ordinary (non redundant-form) comparator. This allows the tag to be accessed early with a redundant-form address. While the non redundant-form tag bits are being completed, the tag bit lines are activated and subsequently used for developing a hit/miss generation (way select). By doing this, the very costly redundant-form compare is avoided without incurring a speed penalty. Additionally, since only one set of sense amplifiers is selected during the redundant-form access, the sensing power is minimized. Moreover, the shared data buses between the subarrays provides metal trace reduction in the fabrication of an integrated circuit employing the disclosed memory.

Figure 1:
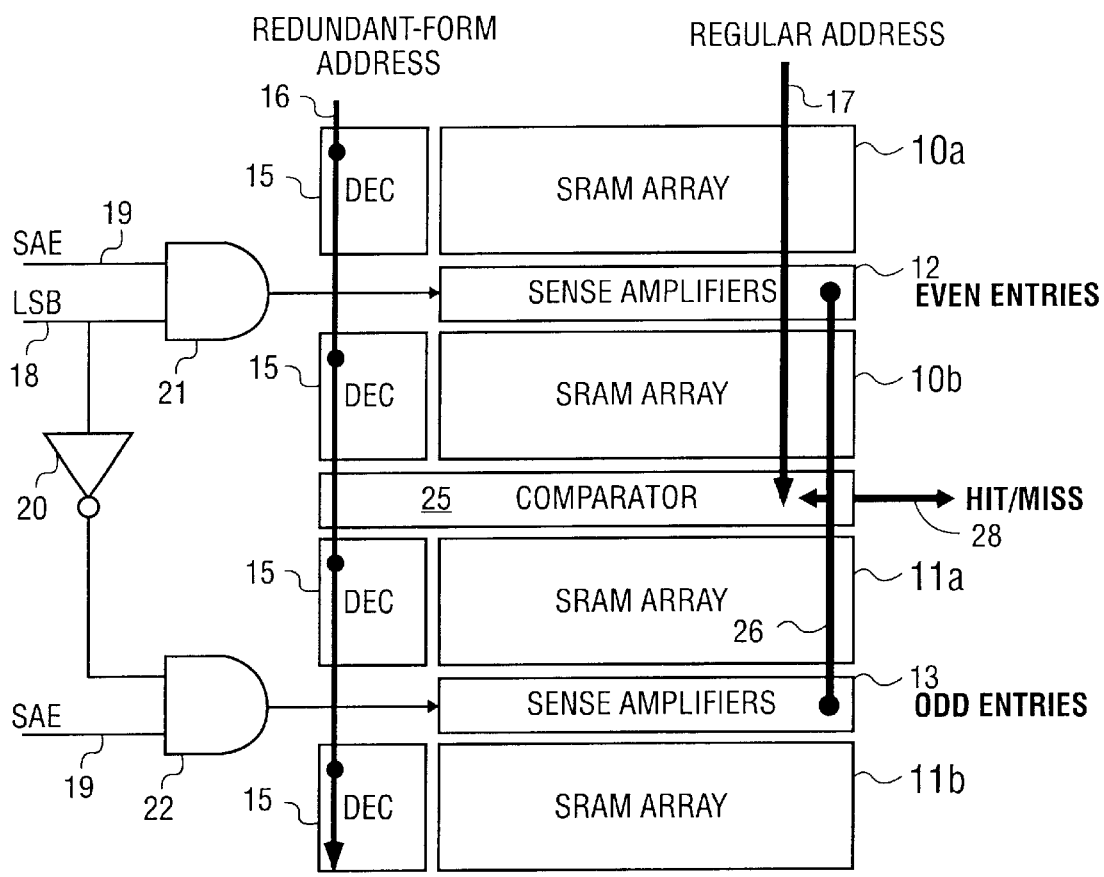
FIG. 1 is a block diagram illustrating an embodiment of the present invention.

Embodiment of FIG. 1

Referring to FIG. 1, the memory includes an even subarray shown as arrays 10a and 10b and an odd subarrays comprising arrays 11a and 11b. These are ordinary static random-access memory (SRAM) arrays such as are often found in a cache memory. Arrays 10a and 10b are associated with the sense amplifiers 12. A tag field from array 10a or 10b may be sensed by the amplifiers 12 and coupled to the comparators 25 on data bus 26. Similarly, the arrays 11a and 11b are associated with the sense amplifiers 13. When lines are selected in these arrays, they are sensed by the sense amplifiers 13 with a tag field being coupled to the comparator 25 on data bus 26. It should be noted that the data bus 26 is common to both subarrays; however, as will be seen, only one set of sense amplifiers 12 or 13 are activated at any one time.

Decoders 15 are redundant-form address decoders which receive the redundant-form address on lines 16 and which select a line or lines in both of the subarrays. These decoders are described in more detail in the references cited in the "Prior Art And Related Art" section of this application.

The ordinary tag position of the address (that is the non redundant-form address) is coupled on lines 17 to the comparator 25. Within the comparator 25, this address is compared with the stored tag to provide a hit or miss indication on line 28 as is typically done. The comparators, as mentioned previously, are ordinary non redundant-form comparators, and operate on the ordinary address on lines 17 and a tag from the arrays.

Most typically, the hit/miss signal is coupled to a data array for selecting the data. For instance, in a four-way associative cache, one of four lines of data may be selected.

The LSB of the ordinary address is coupled to the AND gate 21 and also through inverter 20 to the AND gate 22. A sense amplifier enable signal (SAE) on line 19 is also coupled to the gates 21 and 22. If the LSB is even (a binary 1), the sense amplifiers 12 are selected when SAE is active. On the other hand, if the LSB is odd, the sense amplifiers 13 are selected through the output of the gate 22 when the SAE is active.

Figure 3:
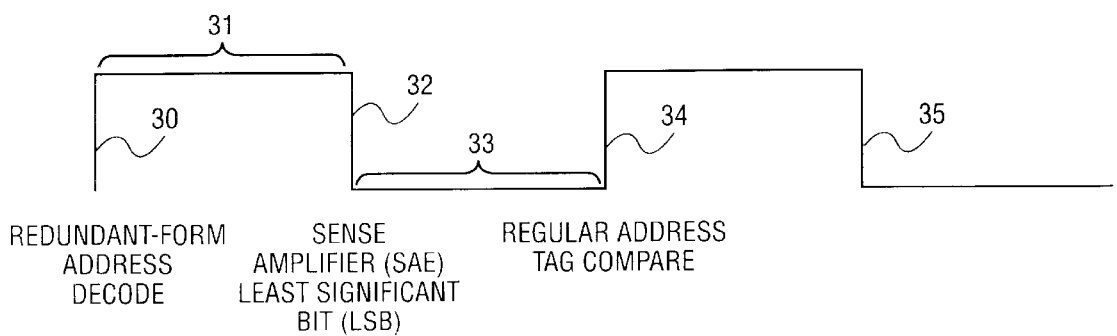
FIG. 3 is a timing diagram used in conjunction with the block diagram of FIG. 1.

As shown in FIG. 3, at time 30, assume that a redundant-form address is coupled to the decoders 15. The redundant-form address is decoded during time 31. This causes at lease one line to be selected in each of the subarrays 10 and 11, that is the word lines in both subarrays are turned on. Additionally, in one embodiment, a small differential voltage is developed at the bit lines in the arrays.

At time 32, the LSB of the ordinary address will have been determined. This bit and its complement are coupled to the gates 21 and 22, respectively. As mentioned, if the LSB is even, then the amplifiers 12 are selected whereas if it is odd, the amplifiers 13 are selected. During time 33, the sense amplifiers can sense the tag field being coupled to the comparator 25 from the selected subarray. At time 34, the ordinary address will become available and is coupled to the comparator 25 on line 17. At time 35, the comparison will have been completed and a hit or miss signal will be provided on the line 28 allowing, for instance, the selection of data from the data array.

Method of the Present Invention

Figure 2:
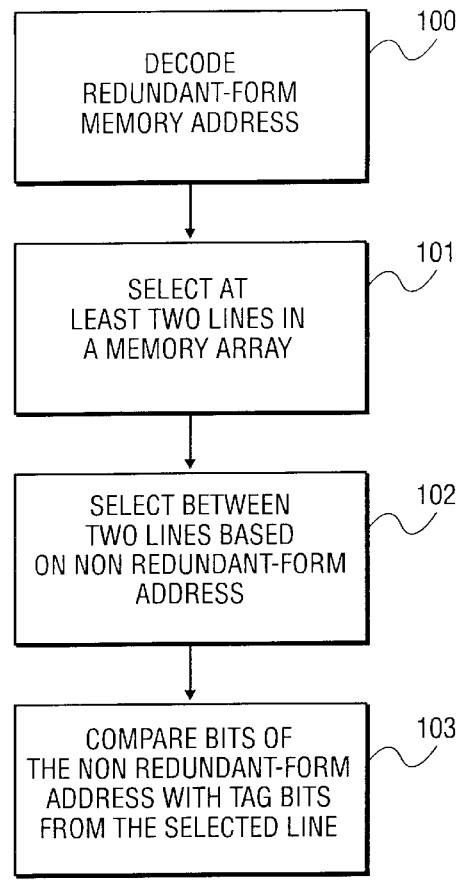
FIG. 2 is a flow diagram illustrating the steps of one embodiment of the present invention.

Referring now to FIG. 2, the method of the present invention is shown beginning with step 100 where the decoding of the redundant-form memory address occurs. This decoded address is used as mentioned to select one or more lines in the each of the subarrays as shown by step 101.

Now as show by step 102, selected lines from only one of the subarrays is selected based on the redundant-form address, for instance, based on the LSB of the ordinary address signal.

The tag field selected by step 102 is then compared with the bits of the non redundant-form address to provide a hit or miss signal as indicated by step 103.

In the above description, the array was divided into odd and even subarrays, and the least significant bit was used to select between these arrays. In another embodiment, it is possible to use the two least significant bits, or for that matter, any number of least significant bits, and to divide the array for instance, into four subarrays and to select between the four subarrays using the two least significant bits. Also in the above description, it was assumed that the tag field and related data were read from the array at the same time. It is also possible to first compare the tag field with the non redundant-form address and then, for instance, read data based on the status of a hit/miss signal. Other alternate embodiments will be apparent to one skilled in the art.

Thus, a cache memory implying redundant-form addresses and non redundant-form addresses where the compare function has been described.

What is claimed:

1. A memory comprising:

a first and a second array;

redundant-form address decoders coupled to the first and second arrays, correspondingly, for selecting a word line in each of the first and second arrays;

a circuit for selecting between the selected word lines in the first and second arrays based on at least one bit of a non redundant-form memory address.

2. The memory defined by claim 1 wherein the one bit of the non redundant-form memory address is the least significant bit of the address.

3. The memory defined by claim 1 wherein data from the first and second memory arrays are coupled to common lines.

4. The memory defined by claim 1 wherein the circuit for selecting between the selected lines includes first and second sense amplifiers wherein one of the first and second sense amplifiers are activated by the one bit of the non redundant-form memory address.

5. The memory defined by claim 4 wherein the one bit of the non redundant-form memory address is the least significant bit of the address.

6. The memory defined by claim 5 wherein data from the first and second memory arrays are coupled to common lines.

7. The memory defined by claim 6 including a comparator coupled to receive signals from the first and second sense amplifiers and coupled to receive bits of the non redundant-form memory address.

8. The memory defined by claim 7 wherein the comparator provides a hit/miss signal.

9. The memory defined by claim 1 including a comparator for receiving signals from the sense amplifiers and coupled to receive non redundant-form address bits.

10. A memory comprising:

a storage array separated into at least two subarrays;

redundant-form decoders for selecting at least one word line in each of the subarrays in response to redundant-form address bits;

first sense amplifiers coupled to one of the subarrays;

second sense amplifiers coupled to the other of the subarrays;

a selection circuit for selecting data from one of the first and second sense amplifiers in response to at least one bit of a non redundant-form address.

11. The memory defined by claim 10 wherein the one bit of the non redundant-form address is the least significant bit of the address.

12. The memory defined by claim 11 wherein the first and second sense amplifiers are coupled to common output lines.

13. The memory defined by claim 12 including a comparator coupled to receive a tag field from the selected one of the subarrays and non redundant-form address bits.

14. The memory defined by claim 10 including a comparator coupled to receive a tag field from the selected one of the subarrays and non redundant-form address bits.

15. A method for accessing a memory comprising:

selecting first and second data based on a redundant-form address; and selecting between the first and second data based on at least one bit of a non redundant-form address.

16. The method defined by claim 15 wherein the one bit of the non redundant-form is the least significant bit of the address.

17. The method defined by claim 15 including the step of comparing part of the selected data with bits of non redundant-form address.

18. The memory defined by claim 17 wherein the one bit of the non redundant-form address is the least significant bit.

19. A method comprising the steps of:

decoding a redundant-form memory address;

selecting at least two word lines in a memory array based on the decoded redundant-form memory address;

selecting between the two lines based on at least one bit of a non redundant-form memory address;

comparing bits of the non redundant-form memory address with tag bits from the selected line.

20. The memory defined by claim 19 wherein the one bit of the non redundant-form memory address is the least significant bit of the address.

21. The method defined by claim 20 including the step of providing a hit/miss signal.

* * * * *